United States Patent Office 2,707,186
Patented Apr. 26, 1955

2,707,186

IMIDAZOLONE DERIVATIVES

Robert Duschinsky, Essex Fells, N. J., assignor to Hoffmann-La Roche Inc., Nutley, N. J., a corporation of New Jersey No Drawing. Application May 6, 1954,
Serial No. 428,130

8 Claims. (Cl. 260—309.6)

This invention relates to novel 2-imidazolone derivatives, processes of making said derivatives, and novel intermediates used in said processes. As will be seen from formula (I) below, which represents graphically the final products forming part of the invention, said 2-imidazolone derivatives are further characterized in that they are substituted at least in the 1-position of the imidazolone nucleus, and in some cases also in the 3-position of the imidazolone nucleus. The substituent in the 1-position, in the compounds of the invention, is an α-substituted-benzyl radical, wherein the α-substituent is selected from the group consisting of phenyl, mono(lower alkyl)phenyl, mono(lower alkoxy)phenyl, monohalophenyl, mononitrophenyl, lower alkyl and cycloalkyl; and in which the phenyl nucleus of the benzyl radical may additionally carry a substituent selected from the group consisting of lower alkyl, lower alkoxy, halo and nitro. The substituent in the 3-position, when present, is selected from the group consisting of lower alkyl and lower alkanoyl radicals. Illustrative α-substituted benzyl radicals, which can thus appear in the 1-position of the imidazolone nucleus, are, for example: benzhydryl, α-ethyl-benzyl, α-(n-propyl)benzyl, p-methylbenzhydryl, p-methoxybenzhydryl, p, p'-dimethoxybenzyhydryl, p-nitrobenzhydryl, α-cyclohexylbenzyl and the like. Illustrative substitutents which can appear in the 3-position are, for example: methyl, ethyl, n-butyl, acetyl, propionyl and the like; it being understood, however, that the 3-position may be unsubstituted. It will thus be seen that the compounds of the invention can be characterized by the general formula (I) below:

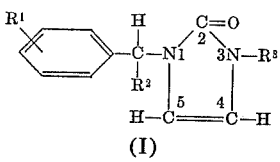

(I)

In the above general formula, $R^1$ represents a radical selected from the group consisting of hydrogen, lower alkyl, lower alkoxy, halo and nitro; $R^2$ represents a radical selected from the group consisting of phenyl, mono(lower alkyl)phenyl, mono(lower alkoxy)phenyl, monohalophenyl, mononitrophenyl, lower alkyl and cycloalkyl; and $R^3$ represents a radical selected from the group consisting of hydrogen, lower alkyl and lower alkanoyl.

Compounds of formula (I) are useful in therapeutics and more particularly they are useful as anticonvulsants.

One preferred embodiment of the invention relates to compounds having the general formula (Ia) below:

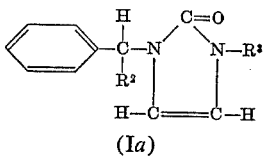

(Ia)

wherein $R^2$ represents a radical selected from the group consisting of phenyl, p-tolyl, p-chlorophenyl, p-bromophenyl, p-methoxyphenyl, p-nitrophenyl, methyl, ethyl and cyclohexyl; and $R^3$ represents a radical selected from the class consisting of hydrogen and lower alkyl.

Another preferred embodiment of the invention relates to those compounds identified by the generic designation 1-benzhydryl-3-lower alkyl-2-imidazolone, especially that species thereof designated 1-benzhydryl-3-methyl-2-imidazolone.

Still another preferred embodiment of the invention relates to those compounds identified by the generic designation 1-(α[lower alkyl]benzyl)-3-lower alkyl-2-imidazolone, especially that species thereof designated 1-α(ethylbenzyl)-3-methyl-2-imidazolone.

A general process of making compounds included within the invention comprises the steps of: (A) reacting an ester of isocyanic acid of formula (II) below with an aminoacetaldehyde di(lower alkyl)acetal of formula (III) below, to produce a 1-(α-substituted-benzyl)-3-(formylmethyl)-urea di(lower alkyl)acetal of formula (IV) below, e. g. by heating the reactants together; and (B) ring closing the compound of formula (IV) by treating it with an acid medium to split out two mols of the alcohol $R^4OH$ and thereby form the 2-imidazolone final product of formula (I) above, e. g. by heating the compound of formula (IV) in aqueous-alcoholic hydrohalic acid solution. These steps respectively can be represented graphically by the equations designated (A) and (B) below:

(A)

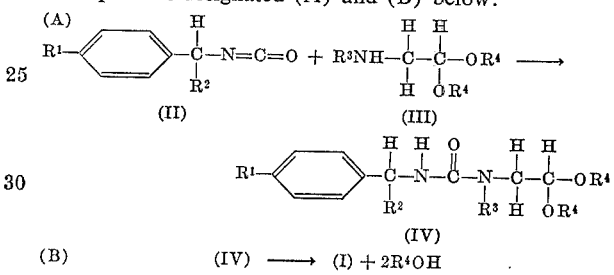

(B) (IV) ⟶ (I) + 2R⁴OH

In the above equations, the symbols $R^1$ and $R^2$ have the same significance as in formula (I), $R^3$ represents hydrogen or a lower alkyl radical, and $R^4$ represents a lower alkyl radical.

A general process of making other compounds included within the invention, specifically those products wherein $R^3$ represents a lower alkanoyl radical, comprises a step of heating with an acid anhydride the corresponding compounds wherein $R^3$ represents hydrogen. For example, 1-benzhydryl-3-(lower alkanoyl)-2-imidazolone can be prepared by refluxing 1-benzhydryl-2-imidazolone with an acid anhydride of a lower alkanoic acid, e. g. acetic anhydride or n-butyric anhydride.

An alternative process for making the products of formula (IV) above wherein $R^1$ represents hydrogen, $R^2$ represents phenyl, $R^3$ represents a lower alkyl radical and $R^4$ represents a lower alkyl radical (i. e. the group of compounds generically designated 1-benzhydryl-3-lower alkyl-3(formylmethyl)urea di(lower alkyl) acetal (formula (IVa) below) comprises the step of reacting 4,4-diphenyl-2,5-oxazolidinedione (formula (V) below) with (lower alkyl)aminoacetaldehyde di(lower alkyl) acetal (formula (IIa) below). This general process can be represented graphically by the following formula scheme:

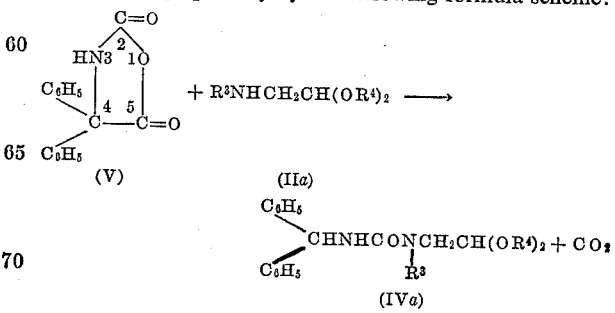

The invention is further disclosed in the following examples, which are illustrative but not limitative thereof. All temperatures are stated in degrees centigrade and are corrected.

*Example 1.* — *1-benzhydryl-3-methyl-3-(formylmethyl)-urea dimethyl acetal*

*Method A.*—A solution of 86 g. of methylaminoacetaldehyde dimethyl acetal [Kermack et al., J. Chem. Soc., 121, 1884 (1922)] in 500 ml. of benzene was slowly added to a solution of 151 g. of benzhydryl isocyanate in 500 ml. of benzene. The resultant solution was refluxed fifteen minutes. To crystallize the product, 1.5 l. of petroleum ether (B. P. 30–60°) was added. The product was filtered and washed with petroleum ether. After recrystallization from toluene and petroleum ether, the product, 1-benzhydryl-3-methyl-3-(formylmethyl)-urea dimethyl acetal, melted at 111–111.5°.

*Method B.*—A solution of 11.35 g. of methylaminoacetaldehyde dimethyl acetal and 24.10 g. of 4,4-diphenyl-2,5-oxazolidinedione (U. S. Patent No. 2,578,293) in 20 ml. of dry dioxane was refluxed for 3 hours. After cooling, crystallization of the product started, which was completed by the addition of 70 ml. of petroleum ether (B. P. 30–60°). The product, 1-benzhydryl-3-methyl - 3 - (formylmethyl)urea dimethyl acetal, was filtered and washed with petroleum ether.

*Example 2.—1-benzhydryl-3-methyl-2-imidazolone*

A solution of 195.7 g. of 1-benzylhydryl-3-methyl-3-(formylmethyl)urea dimethyl acetal in 400 ml. of alcohol and 227 ml. of 1.98 N hydrochloric acid was refluxed for twenty-five minutes. After cooling and addition of 200 ml. of water, the product which crystallized, 1-benzhydryl-3-methyl-2-imidazolone, was filtered and washed with aqueous alcohol. It melted at 166° after recrystallization by dissolving in absolute alcohol and addition of petroleum ether.

*Example 3.—1-(α-ethylbenzyl)-3-methyl-3-(formylmethyl)urea dimethyl acetal*

A solution of 49.2 g. of 2-phenylbutyric acid in 30 ml. of thionyl chloride was heated on the water bath for two hours. The excess of thionyl chloride was removed by distillation and the residue was fractionally distilled in vacuo. The product, 2-phenylbutyryl chloride, had a boiling point of 109° at 13 mm.

A solution of 49.8 g. of 2-phenylbutyryl chloride in 100 ml. of benzene was refluxed on a steam bath for four and one-half hours with 21.3 g. of sodium azide activated according to R. Adams, Organic Reactions. Vol. 3, page 382 (1946). The mixture of sodium salts was filtered and the filtrate was fractionally distilled in vacuo. A portion of the fraction distilling at 105–106°/17 mm., α-ethylbenzyl isocyanate, was used in the following step.

A solution of 11.3 g. of α-ethylbenzyl isocyanate, B. P. 105–106°/17 mm., and 8.33 g. of methylaminoacetaldehyde dimethyl acetal in 35 ml. of benzene was refluxed for thirty minutes. Upon concentration in vacuo, a syrup of 1 - (α-ethylbenzyl)-3-methyl-3-(formylmethyl)urea dimethyl acetal was obtained, which was used directly in the following Example 4.

*Example 4. — 1-(α-ethylbenzyl)-3-methyl-2-imidazolone*

All of the syrup obtained as the product of Example 3 above was mixed with 28 ml. of ethanol and 70 ml. of normal hydrochloric acid. After refluxing for five minutes the solution was cooled, whereupon the product, 1-(α-ethylbenzyl)-3-methyl-2-imidazolone, crystallized. It was filtered and washed with aqueous ethanol. M. P. 107°.

*Example 5. — 1-(α-methylbenzyl)-3-(formylmethyl)urea dimethyl acetal*

A solution of 50 g. of α-methylbenzylamine in 500 ml. toluene was saturated with hydrogen chloride. After addition of 250 ml. more toluene, phosgene was bubbled through the suspension of the hydrochloride, while refluxing, for four hours. The clear resultant solution was distilled in vacuo. A fraction containing essentially α-methylbenzyl isocyanate boiling at 92–95° at 17 mm. was obtained.

A mixture of 14.7 g. of a α-methylbenzyl isocyanate and of 10.5 g. aminoacetaldehyde dimethly acetal in 200 ml. of benzene was refluxed for 20 minutes. Upon removal of the solvent in vacuo 1-(α-methylbenzyl)-3-(formylmethyl)urea dimethyl acetal was obtained as an oil.

*Example 6.—1-(α-methylbenzyl)-2-imidazolone*

The total acetal produced according to Example 5 above was refluxed for 25 minutes with a mixture of 100 ml. of alcohol and 100 ml. of one normal hydrochloric acid. 1 - (α - methylbenzyl)-2-imidazolone crystallized upon addition of 250 ml. of water and cooling. The product melted at 125–126.5°, and after recrystallization from xylene at 128–129°.

*Example 7. — 1-(α-ethylbenzyl)-3-ethyl-3-(formylmethyl)urea dimethyl acetal*

A mixture of 350 g. of ethylamine, 600 ml. of methanol, and 112 g. of chloroacetaldehyde dimethyl acetal was autoclaved at 140–146° for 24 hours. The solvent was removed on the steam bath at atmospheric pressure and the oily residue was treated with 4 times its volume of ether, 200 ml. of water and saturated with anhydrous potassium carbonate. The ethereal layer was separated and the aqueous layer was extracted four times with 200 ml. portions of ether. The combined ethereal layer was dried over potassium carbonate and then distilled. The fraction boiling at 153–156°, $n_D^{28}=1.4120$, was N-ethylamino acetaldehyde dimethyl acetal.

A mixture of 9.45 g. of α-ethylbenzyl isocyanate, 7.85 g. of N-ethylaminoacetaldehyde dimethyl acetal, and 30 ml. of benzene was refluxed for 30 minutes. The solvent was removed in vacuo. The product, a syrup of 1-(α-ethylbenzyl) - 3 - ethyl-3-(formylmethylurea) dimethyl acetal, was used directly for the following Example 8.

*Example 8.—1-(α-ethylbenzyl)-3-ethyl-2-imidazolone*

To the product of Example 7 were added 60 ml. of alcohol and 59 ml. of normal hydrochloric acid, and this mixture was refluxed for 40 minutes. The resultant solution was distilled in vacuo and yielded a crystallizing fraction of boiling range 148–152° at 0.6 mm. After pressing on a porous plate the product was recrystallized from 130 ml. of 70–90° petroleum ether. The 1-(α-ethylbenzyl)-3-ethyl-2-imidazolone so obtained melted at 63–65°.

*Example 9.—1-benzhydryl-3-(formylmethyl)urea dimethyl acetal*

When 53.3 g. of benzhydryl isocyanate and 26.3 g. of aminoacetaldehyde dimethyl acetal were refluxed in benzene, 1 - benzhydryl - 3 - (formylmethyl)urea dimethyl acetal, melting at 140–141° was obtained.

*Example 10.—1-benzhydryl-2-imidazolone*

The acetal product of Example 9 gave, upon refluxing with 550 ml. of ethanol and 232 ml. of normal hydrochloric acid, 1-benzhydryl-2-imidazolone, which was recrystallized from one liter of 50 per cent aqueous ethanol. M. P. 214–215°.

*Example 11.—1-(α-cyclohexylbenzyl)-3-(formylmethyl)urea dimethyl acetal*

A mixture of 1.08 g. of α-cyclohexylbenzyl isocyanate, 0.525 g. of aminoacetaldehyde dimethyl acetal and 5 ml. of benzene was heated on the steam bath for 10 minutes. After cooling and addition of 15 ml. of petroleum ether the product crystallized and was filtered. Recrystallization from a mixture of benzene and petroleum ether gave 1 - (α-cyclohexylbenzyl)-3-(formylmethyl)urea dimethyl acetal, melting at 136–137°.

*Example 12. — 1-(α-cyclohexylbenzyl)-2-imidazolone*

A solution of 2.21 g. of 1-(α-cyclohexylbenzyl)-3-(formylmethyl)urea dimethyl acetal, 15 ml. of alcohol, 7 ml. of water, and 6.9 ml. of normal hydrochloric acid was heated on the steam bath for 25 minutes. Upon cooling, the product crystallized. It was washed with aqueous ethanol. After recrystallization from a mixture of ethanol and water, the melting point was 206–208°.

*Example 13. — 1 - (α - cyclohexylbenzyl)-3-methyl-3-(formylmethylurea) dimethyl acetal*

When 2.54 g. of α-cyclohexylbenzyl isocyanate and 1.41 g. of N-methylaminoacetaldehyde dimethyl acetal in 10 ml. of benzene was reacted in the manner described in Example 11, 1 - (α - cyclohexylbenzyl) - 3 - methyl-3-(formylmethyl)urea dimethyl acetal was obtained, melting at 98–99° after recrystallization from benzene-petroleum ether.

*Example 14.—1-(α-cyclohexylbenzyl)-3-methyl-2-imidazolone*

A mixture of 2.35 g. of the acetal product of Example 13, 14 ml. of 0.5 normal hydrochloric acid, and 14 ml. of ethanol was refluxed for 15 minutes. Upon cooling, 1-(α-cyclohexylbenzyl)-3-methyl-2-imidazolone crystallized, melting at 198–199°.

*Example 15.—1-(α-cyclohexylbenzyl)-3-ethyl-3-(formylmethyl)urea dimethyl acetal*

Reaction of 2.15 g. of α-cyclohexylbenzyl isocyanate and 1.33 g. of N-ethylaminoacetaldehyde dimethyl acetal in the manner described in Example 11 gave 1-(α-cyclohexylbenzyl) - 3 - ethyl-3-(formylmethyl)urea dimethyl acetal, melting at 75°.

*Example 16.—1 - (α-cyclohexylbenzyl)-3-ethyl-2-imidazolone*

2.31 g. of the product of Example 15, upon hydrolysis with 6.65 ml. of normal hydrochloric acid and 8 ml. of alcohol for 35 minutes yielded 1-(α-cyclohexylbenzyl)-3-ethyl-2-imidazolone, which was recrystallized from benzene-petroleum ether and melted at 146–147°.

*Example 17.—1-(p-chlorobenzhydryl)-3-(formylmethyl)-urea diethyl acetal*

A mixture of 9.74 g. of p-chlorobenzhydryl isocyanate, 5.32 g. of aminoacetaldehyde diethyl acetal, and 400 ml. of benzene was refluxed 40 minutes. Upon addition of 150 ml. of petroleum ether, 1-(p-chlorobenzhydryl)-3-(formylmethyl)urea diethyl acetal, melting at 128–129°, crystallized.

*Example 18.—1-(p-chlorobenzhydryl)-2-imidazolone*

A mixture of 7.53 g. of 1-(p-chlorobenzhydryl)-3-(formylmethyl)urea diethyl acetal, 20 ml. of normal hydrochloric acid, and 20 ml. of ethanol was refluxed for 25 minutes. Upon cooling, 1-(p-chlorobenzhydryl)-2-imidazolone crystallized, melting at 222–224°, and after recrystallization from ethanol at 226–227°.

*Example 19.—1-(p-chlorobenzhydryl)-3-(formylmethyl)-3-methylurea dimethyl acetal*

A mixture of 12.2 g. of p-chlorobenzhydryl isocyanate, 5.95 g. of N-methylaminoacetaldehyde dimethyl acetal, and 50 ml. of benzene was refluxed for 30 minutes. Evaporation of the benzene in vacuo gave 1-(p-chlorobenzhydryl)-3-(formylmethyl) - 3 - methylurea dimethyl acetal in the form of a syrup. The product, after crystallization from benzene-petroleum ether, melted at 97–98°.

*Example 20.—1 - (p - chlorobenzhydryl)-3-methyl-2-imidazolone*

The product of Example 19 was dissolved in 50 ml. of ethanol and 50 ml. of normal hydrochloric acid and refluxed 30 minutes. Upon cooling, 1-(p-chlorobenzhydryl)-3-methyl-2-imidazolone crystallized, which after recrystallization from ethyl acetate and 70–90° petroleum ether, melted at 116.5–117.5°.

*Example 21.—1-(p-chlorobenzhydryl)-3-ethyl-3-(formylmethyl)urea dimethyl acetal*

A mixture of 2.44 g. of p-chlorobenzhydryl isocyanate, 1.33 g. of N-ethylaminoacetaldehyde dimethyl acetal, and 10 ml. of benzene was refluxed for 30 minutes. The product, 1-(p-chlorobenzhydryl)-3-ethyl-3-(formylmethyl)urea dimethyl acetal, was crystallized by the addition of 70–90° petroleum ether, and was recrystallized from benzene-petroleum ether; melting point, 84–85°.

*Example 22.—1-(p-chlorobenzhydryl)-3 - ethyl - 2 - imidazolone*

A mixture of 1.13 g. of the above urea, 4 ml. of ethanol, and 3 ml. of normal hydrochloric acid was refluxed for one half hour. The 1-(p-chlorobenzhydryl)-3-ethyl-2-imidazolone crystallized upon the addition of water; melting point, 94–95°.

*Example 23.—1 - (p - bromobenzhydryl) - 3 - methyl-3-(formylmethyl)urea dimethyl acetal*

A mixture of 11.5 g. of p-bromobenzhydryl isocyanate, 4.76 g. of N-methylaminoacetaldehyde dimethyl acetal and 20 ml. of benzene was refluxed for 30 minutes. Upon cooling, the 1-(p-bromobenzhydryl)-3-methyl-3-(formylmethyl)urea dimethyl acetal crystallized and was washed with petroleum ether. The product was recrystallized from benzene-petroleum ether and melted at 122–123°.

*Example 24.—1 - (p-bromobenzhydryl)-3-methyl-2-imidazolone*

A mixture of 4.07 g. of the product of Example 23, 25 ml. of ethanol, and 10 ml. of normal hydrochloric acid was refluxed for 30 minutes. Upon addition of 25 ml. of water and cooling, the 1-(p-bromobenzhydryl)-3-methyl-2-imidazolone crystallized. The product was filtered and washed with 50 per cent aqueous ethanol. It was recrystallized from a mixture of ethanol and water and melted at 135.5–136.5°.

*Example 25.—1-(p-bromobenzhydryl)-3-ethyl-3-(formylmethyl)urea dimethyl acetal*

A mixture of 11.5 g. of p-bromobenzhydryl isocyanate, 5.32 g. of N-ethylaminoacetaldehyde dimethyl acetal and 20 ml. of benzene was refluxed for 30 minutes. Upon cooling and addition of 100 ml. of 30–60° petroleum ether the 1-(p-bromobenzhydryl) - 3 - ethyl-3-(formylmethyl)urea dimethyl acetal crystallized; melting point, 86–87.5°.

*Example 26.—1 - (p - bromobenzhydryl)-3-ethyl-2-imidazolone*

A mixture of 4.21 g. of the product of Example 25, 25 ml. of ethanol, and 10 ml. of normal hydrochloric acid was refluxed for 30 minutes. Upon addition of 10 ml. of water and cooling, the 1-(p-bromobenzhydryl)-3-ethyl-2-imidazolone crystallized. After recrystallization from 50 per cent aqueous methanol it melted at 118.5–119.5°.

*Example 27.—1 - (p - methylbenzhydryl) - 3 - methyl-3-(formylmethyl)urea dimethyl acetal*

A mixture of 7.31 g. of p-methylbenzhydryl isocyanate, 3.9 g. of N-methylaminoacetaldehyde dimethyl acetal, and 30 ml. of benzene was refluxed for 45 minutes. After cooling and addition of 60 ml. of 30–60° petroleum ether, the product, 1-(p-methylbenzhydryl)-3-methyl-3-(formylmethyl)urea dimethyl acetal, crystallized and was filtered; melting point, 78–79°.

*Example 28.—1 - (p - methylbenzhydryl) - 3 - methyl-2-imidazolone*

A mixture of 1.03 g. of the product of Example 27, 4 ml. of ethanol, and 3 ml. of normal hydrochloric acid was refluxed 30 minutes. Upon concentration of the solution in vacuo the 1-(p-methylbenzhydryl)-3-methyl-2-imidazolone was obtained as a glassy mass.

*Example 29.—1-(p-nitrobenzhydryl)-3-methyl-3-(formylmethyl)urea dimethyl acetal*

A mixture of 2.43 g. of p-nitrobenzhydryl isocyanate, 1.14 g. of N-methylaminoacetaldehyde dimethyl acetal and 10 ml. of benzene was refluxed 30 minutes. After evaporation of the solvent, the product crystallized and was recrystallized from a mixture of benzene and petroleum ether. It melted at 60–62°.

*Example 30.—1-(p-nitrobenzhydryl)-3-methyl-2-imidazolone*

2.15 g. of the product of Example 29 was dissolved in 8 ml. of ethanol and 5.75 ml. of normal hydrochloric acid and refluxed 45 minutes. After evaporation of the solvents the 1-(p-nitrobenzhydryl)-3-methyl-2-imidazolone was obtained.

*Example 31.—1 - (p-methoxybenzhydryl) - 3 - methyl-3-(formylmethyl)urea dimethyl acetal*

A mixture of 11.1 g. of p-methoxybenzhydryl isocyanate, 5.53 g. of N-methylaminoacetaldehyde dimethyl acetal, and 50 ml. of benzene was refluxed 35 minutes. Upon addition of 200 ml. of 30–60° petroleum ether, the 1-(p-methoxybenzhydryl) - 3 - methyl-3-(formylmethyl)-urea dimethyl acetal crystallized; melting point, 76–77°.

*Example 32.—1-(p-methoxybenzhydryl) - 3 - methyl-2-imidazolone*

A mixture of 9.12 g. of the product of Example 31, 25 ml. of ethanol and 25.5 ml. of normal hydrochloric acid was refluxed 35 minutes. Upon concentration of the solution the imidazolone was obtained as a varnish-like mass.

*Example 33.—1 - (p - methoxybenzhydryl) - 3 - ethyl-3-(formylmethyl)urea dimethyl acetal*

A mixture of 15 g. of p-methoxybenzhydryl isocyanate, 8.35 g. of N-ethylaminoacetaldehyde dimethyl acetal and 50 ml. of benzene was refluxed for 35 minutes. The 1 - (p-methoxybenzhydryl)-3-ethyl-3-(formylmethyl)urea dimethyl acetal crystallized upon addition of petroleum ether. After recrystallization from a mixture of benzene and 30–60° petroleum ether, the product melted at 74–75°.

*Example 34.—1-(p-methoxybenzhydryl)-3-ethyl-2-imidazolone*

A mixture of 14.88 g. of the product of Example 33, 28 ml. of ethanol, and 40 ml. of normal hydrochloric acid was refluxed for one hour. Upon cooling the 1-(p-methoxybenzhydryl)-3-ethyl-2-imidazolone crystallized. It was filtered and washed with water. After recrystallization from a mixture of benzene and petroleum ether, the product melted at 117–118°.

*Example 35.—1-benzhydryl-3-ethyl-3-(formylmethyl)-urea dimethyl acetal*

A mixture of 10.81 g. of benzhydryl isocyanate, 6.9 g. of N-ethylaminoacetaldehyde dimethyl acetal, and 30 ml. of benzene was refluxed 15 minutes. The product was 1-benzhydryl-3-ethyl-3-(formylmethyl)urea dimethyl acetal.

*Example 36.—1-benzhydryl-3-ethyl-2-imidazolone*

After removing the solvent in vacuo, 50 ml. of alcohol and 50 ml. of normal hydrochloric acid were added to the product of Example 35 and the mixture heated on the steam bath one-half hour. After removal of the solvents in vacuo the resultant oily residue was extracted in a Soxhlet apparatus with 30–60° petroleum ether. Evaporation of the petroleum ether left a semi-crystalline residue of 1-benzhydryl-3-ethyl-2-imidazolone, which was recrystallized from 70–90° petroleum ether. Melting point, 84–85° after a second recrystallization from 70–90° petroleum ether.

*Example 37.—1-(p,p'-dimethoxybenzhydryl)-3-(formylmethyl)urea diethyl acetal*

A mixture of 2.69 g. of p,p'-dimethoxybenzhydryl isocyanate, 1.33 g. of aminoacetaldehyde diethyl acetal and 15 ml. of benzene was refluxed for 20 minutes. Upon cooling and addition of 15 ml. of petroleum ether (B. P. 30–60°) the 1-(p,p'-dimethoxybenzhydryl)-3-(formylmethyl)urea diethyl acetal crystallized. M. P. 138–139°.

*Example 38.—1-(p,p'-dimethoxybenzhydryl)-2-imidazolone*

A mixture of 2.81 g. of the product of Example 37, 10 ml. of ethanol and 7 ml. of normal hydrochloric acid was refluxed for 30 minutes. Upon addition of 25 ml. of water, the 1-(p,p'-dimethoxybenzhydryl)-2-imidazolone precipitated. After recrystallization from ethyl acetate, the product melted at 199°.

*Example 39.—1-benzhydryl-3-acetyl-2-imidazolone*

A mixture of 12.7 g. of 1-benzhydryl-2-imidazolone and 180 ml. of acetic anhydride was refluxed for 30 minutes. After evaporation of the excess of acetic anhydride, the reaction product was dissolved in 75 ml. of ethanol. The 1-benzhydryl-3-acetyl-2-imidazolone compound crystallized upon cooling in a Dry Ice-acetone bath. It was washed with cold ethanol and petroleum ether. M. P. 130–131° after recrystallization from 70 ml. of ethanol.

*Example 40.—1-benzhydryl-3-propionyl-2-imidazolone*

The propionyl compound was prepared in an analogous manner to Example 39, from 10 g. of 1-benzhydryl-2-imidazolone and 100 ml. of propionic anhydride. The 1-benzhydryl-3-propionyl-2-imidazolone was crystallized from ethanol. M. P. 98–99°.

This application is a continuation-in-part of my copending application Serial No. 366,050, filed July 3, 1953, now abandoned.

I claim:

1. A compound having the formula

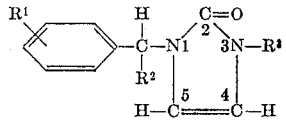

wherein $R^1$ represents a radical selected from the group consisting of hydrogen, methyl, methoxy, chloro, bromo and nitro; $R^2$ represents a radical selected from the group consisting of phenyl, tolyl, mono(methoxy)phenyl, monochlorophenyl, monobromophenyl, mononitrophenyl, lower alkyl and cyclohexyl; and $R^3$ represents a radical selected from the group consisting of hydrogen, lower alkyl and lower alkanoyl.

2. 1-benzhydryl-2-imidazolone.
3. 1-benzhydryl-3-lower alkyl-2-imidazolone.
4. 1-benzhydryl-3-methyl-2-imidazolone.
5. 1-(α-[lower alkyl]benzyl)-3-lower alkyl-2-imidazolone.
6. 1-α-(methylbenzyl)-3-methyl-2-imidazolone.
7. 1-α-(ethylbenzyl)-3-methyl-2-imidazolone.
8. 1-α-(cyclohexyl)benzyl-3-methyl-2-imidazolone.

References Cited in the file of this patent

Fritsch, Ber. Deut. Chem., vol. 26, p. 427 (1893).
Lehmstedt, Liebig Ann., vol. 456, p. 269 (1927).